UNITED STATES PATENT OFFICE.

WALLACE APPLETON BEATTY, OF NEW YORK, N. Y.

PLASTIC COMPOSITION.

1,188,356.

Specification of Letters Patent. Patented June 20, 1916.

No Drawing. Application filed April 16, 1915. Serial No. 21,755.

*To all whom it may concern:*

Be it known that I, WALLACE APPLETON BEATTY, a citizen of the United States, residing at New York, in the county of New York and State of New York, have invented certain new and useful Improvements in Plastic Compositions; and I do hereby declare the following to be a full, clear, and exact description of the invention, such as will enable others skilled in the art to which it appertains to make and use the same.

This invention relates to a method of producing a plastic composition of matter as well as to said composition as a new article of manufacture, and has for one of its objects to produce said article in a less expensive and more expeditious manner than has been heretofore proposed.

With this and other objects in view the invention consists in the novel steps and combinations of steps and in the novel product constituting my invention all as will be more fully hereinafter disclosed and particularly pointed out in the claims.

Generally stated the new product consists of a cellulose ester and a condensation product of acetone or its homologues with phenol and its homologues.

More specifically stated the invention consists in producing a product which closely resembles and may be substituted for celluloid, by mixing dioxy-diphenyl-dimethyl-methane with nitro-cellulose as will now appear.

It has been found, by experiment, that a plastic substance may be obtained in accordance with the foregoing by mixing nitro-cellulose and dioxy-diphenyl-dimethyl-methane, the formula of which may be written as follows:

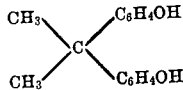

In the instance herein given, the proportions of the constituents and method of operation is substantially as follows: Eighty (80) parts by weight of nitro-cellulose and twenty (20) parts by weight of dioxy-diphenyl-dimethyl-methane are dissolved in a suitable solvent, as amyl acetate alone, or amyl acetate mixed with acetone. In carrying out the operation the excess of solvent is evaporated until the desired viscosity or density of the mass is attained and such density of course will depend upon the particular use for which the substance is intended. The evaporation should best be carried out at as low a temperature as possible, and when the mass is produced, it is treated as would be celluloid in shaping it to the desired use. A convenient temperature to adopt is one low enough to not injure the nitro-cellulose, the cellulose acetate or other substance dissolved in the mass, and yet is high enough to effect the desired evaporation of the solvent. Should this solvent be such that its temperature of evaporation is likely to endanger the dissolved substance, then the evaporation can be conveniently carried out in a vacuum.

The dioxy-diphenyl-dimethyl-methane may be partially replaced by camphor or the so-called camphor substitutes, such as acetanilid, tri-phenyl phosphate, and alkyl derivatives of benzene sulfo-amids, as well as several others specified on pages 248 to 257 of the publication entitled *Nitro-Cellulose Industries*, by Worden, 1911 edition.

The above mentioned dioxy-diphenyl-dimethyl-methane may be conveniently produced as a condensation product by reacting on phenol with acetone, as disclosed in my copending application filed June 6, 1912, Serial Number 702,046 and entitled Artificial gum and process of making the same.

This application differs from my copending application, Serial Number 752253, renewed March 5, 1913, which has eventuated into Patent No. 1,158,961 of Nov. 16, 1915, and entitled Plastic compounds and process of making same, in that it is limited to the use of camphor, or camphor substitutes.

It is obvious that those skilled in the art may vary the proportions of the product, as well as the steps of my process without departing from the spirit of the invention, and therefore I do not wish to be limited to the above disclosure except as may be required by the claims.

What I claim is:

1. A composition of matter comprising a cellulose ester; dioxy-diphenyl-dimethyl-methane; a camphor substitute; and a solvent, substantially as described.

2. A composition of matter comprising nitro-cellulose; dioxy-diphenyl-dimethylmethane; a camphor substitute; and a solvent, substantially as described.

3. A composition of matter comprising nitro-cellulose; dioxy-diphenyl-dimethylmethane; a camphor substitute; and amyl acetate, substantially as described.

4. A composition of matter comprising a cellulose ester; dioxy-diphenyl-dimethylmethane; a camphor substitute; amyl acetate; and acetone, substantially as described.

5. A composition of matter comprising a nitro-cellulose; and a condensation crystalline product of a hydroxy derivative of an aromatic hydrocarbon, amyl acetate; a camphor substitute and acetone, substantially as described.

6. A composition of matter comprising a cellulose ester; dioxy-diphenyl-dimethylmethane; camphor; a camphor substitute; and a solvent, substantially as described.

In testimony whereof I affix my signature, in presence of two witnesses.

WALLACE APPLETON BEATTY.

Witnesses:
EARLE L. BEATTY,
JOHN L. CLARK.